(12) United States Patent
Sheaffer

(10) Patent No.: US 6,965,962 B2
(45) Date of Patent: Nov. 15, 2005

(54) METHOD AND SYSTEM TO OVERLAP POINTER LOAD CACHE MISSES

(75) Inventor: Gad S. Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 10/320,627

(22) Filed: Dec. 17, 2002

(65) Prior Publication Data

US 2004/0117555 A1 Jun. 17, 2004

(51) Int. Cl.⁷ .............................................. G06F 12/00
(52) U.S. Cl. ............................ 711/3; 711/118; 711/119; 711/132; 711/133
(58) Field of Search ............................ 711/3, 118, 132, 711/133, 119; 712/207, 215

(56) References Cited

U.S. PATENT DOCUMENTS

| | | | |
|---|---|---|---|
| 6,009,499 A | * | 12/1999 | Koppala ...................... 711/132 |
| 6,055,622 A | * | 4/2000 | Spillinger ..................... 712/207 |
| 6,269,425 B1 | * | 7/2001 | Mounes-Toussi et al. ... 711/133 |
| 6,351,802 B1 | * | 2/2002 | Sheaffer ...................... 712/215 |
| 6,715,035 B1 | * | 3/2004 | Colglazier et al. .......... 711/118 |

OTHER PUBLICATIONS

Collins–J;Sair–S;Calder–B;Tullsen–D–M, Pointer Cache assisted prefetching, 2002, p. 62–73.*

Paul Mazzucco, "The Fundamentals of Cache" Re–Printed from System.Logic. http://www.sicentral.com/articles/00/10/cache/print.php Downloaded on website Oct. 17, 2000. pp. 1–12.

* cited by examiner

*Primary Examiner*—Mano Padmanabhan
*Assistant Examiner*—Mardochee Chery
(74) *Attorney, Agent, or Firm*—Matthew C. Fagan

(57) ABSTRACT

A computer implemented method of managing processor requests to load data items provides for the classification of the requests based on the type of data being loaded. In one approach, a pointer cache is used, where the pointer cache is dedicated to data items that contain pointers. In other approaches, the cache system replacement scheme is modified to age pointer data items more slowly than non-pointer data items. By classifying load requests, cache misses on pointer loads can be overlapped regardless of whether the pointer loads are part of a linked list of data structures.

19 Claims, 8 Drawing Sheets

METHOD AND SYSTEM TO OVERLAP POINTER LOAD CACHE MISSES

BACKGROUND

1. Technical Field

Embodiments of the present invention generally relate to computer processors. More particularly, embodiments of the invention relate to the handling of pointer load cache misses.

2. Discussion

In the highly competitive computer industry, the trend toward faster processing speeds and increased functionality is well documented. While this trend is desirable to the consumer, it presents significant challenges to processor designers as well as manufacturers. A particular challenge relates to the management of processor requests to load data items. In modern day processors, a hierarchical memory architecture is used to increase the speed at which data can be retrieved and instructions can be executed. For example, the memory architecture typically has an off-chip portion and on-chip portion. The on-chip portion can be accessed at relatively high speeds and is often referred to as a cache system, such as the cache system 20 shown in FIG. 2. Cache system 20 may be operatively coupled to a processor 100 and a processor bus 102. The processor 100 may be an N-bit processor and typically includes a decoder (not shown) and one or more N-bit registers (not shown). The processor bus 102 may also be coupled to a system logic 104 and a system (or off-chip) memory 106, where the system logic 104 and system memory 106 may communicate directly via bus 108.

The conventional cache system 20 has a level one (L1) cache 22 and a level two (L2) cache 24. By storing items such as instructions, pointer data and computational data in the cache system 20, significant time savings can be achieved for a number of reasons. For example, the cache memory is commonly made out of the static random access memory (SRAM), which can be accessed much faster than the structures used for off-chip memory. Furthermore, the cache memory is in closer physical proximity to the processor 100. The L1 cache 22 can typically be accessed at a higher rate than the L2 cache 24, but is smaller than the L2 cache 24. Thus, if a data access request is received from one of the execution units (not shown) of the processor 100, a memory access request is issued to the L1 cache 22 in order to rapidly return a result to the request. If the data item corresponding to the request is not found in the L1 cache 22, a L1 cache "miss" has occurred and the L2 cache 24 is issued a request. This process is shown in greater detail in the flowchart 26 of FIG. 3. The difficulty arises, however, when the data being operated upon is organized in a linked list of data structures such as the list 28 shown in FIG. 4.

Specifically, each data structure 30 in the list 28 often includes a pointer 32 to the address of the next data structure. The difficulty arises when a first data item such as pointer 32a is not found in the L1 cache or the L2 cache. In such a case, the pointer 32a must be retrieved from off-chip memory 106 (FIG. 2), which typically consumes an undesirably large amount of time. Furthermore, since the data structure 30b corresponding to the address defined by pointer 32a also includes a pointer 32b, Address Z cannot be calculated until data structure 30b is retrieved all the way from off-chip memory. While certain pre-fetching schemes, such as the approach described in U.S. Pat. No. 6,055,622 to Spillinger, can be useful when there is a predictable regularity in the sequence of addresses in the list 28, this regularity does not exist in the described case of a linked list. In such cases, it has been determined that latency can become an issue of particular concern.

BRIEF DESCRIPTION OF THE DRAWINGS

The various advantages of embodiments of the present invention will become apparent to one skilled in the art by reading the following specification and appended claims, and by referencing the following drawings, in which:

DETAILED DESCRIPTION

Figure 1A:
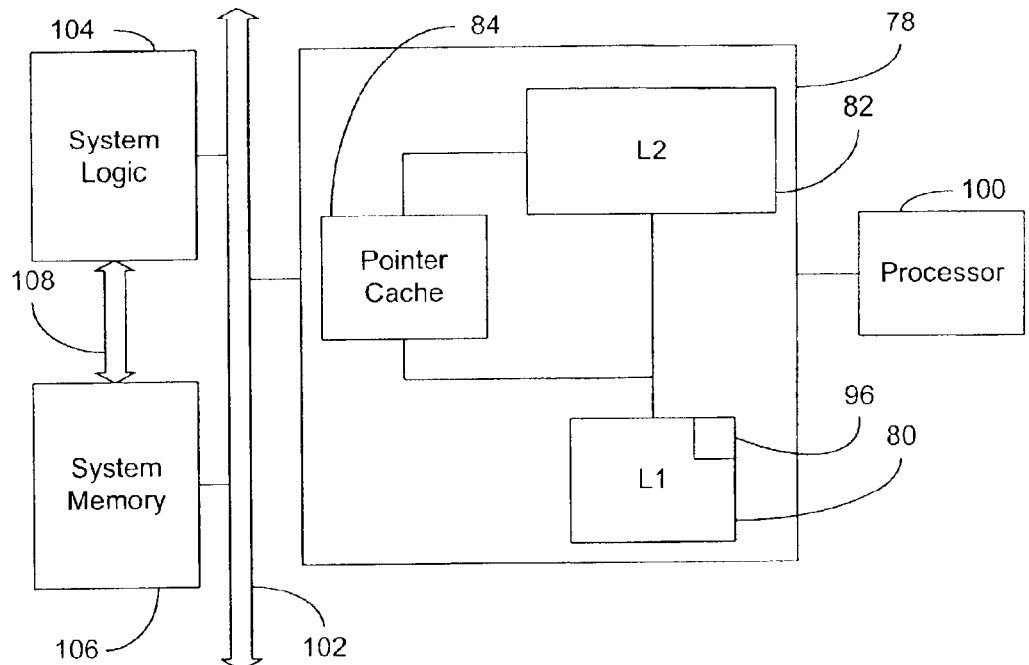
FIG. 1A is a block diagram of an example of a microprocessor cache system in accordance with one embodiment of the invention.

Exemplary embodiments provide a mechanism to overlap cache misses on pointer loads with any other type of load. Turning now to FIG. 5A, it can be seen that method 34 provides for managing processor requests to load data items in a unique and beneficial manner. While the method 34 will primarily be described with respect to linked lists of data structures such as list 28 (FIG. 4), it will be appreciated that the embodiments of the invention are not so limited. In fact, the method 34 can be useful in any processing scheme in which latency is an issue of concern. Notwithstanding, there are a number of aspects of linked lists for which method 34 is uniquely suited.

Generally, it can be seen that a memory request is issued to a level one (L1) cache of the processor for a first data item at processing block 36. If a cache miss occurs at block 40, block 38 provides for determining whether the first data item is a pointer. If the first data item is a pointer, a memory request is issued to a pointer cache at block 42 for the first data item. It is important to note that conventional approaches neither provide for determining whether the first data item is a pointer, nor the use of a pointer cache as shown. As will be discussed in greater detail below, the pointer cache is dedicated to pointer data, and is one approach to addressing latency with regard to linked lists of data structures. Alternatively, modifications can be made to conventional L1/L2 caches to address latency. The alternative approach will be discussed in greater detail below. Nevertheless, if a pointer cache hit occurs at block 44, the first data item is retrieved from the pointer cache at block 46. FIG. 5B demonstrates in method 34' that the pointer cache can be checked before the L1 cache by determining whether the data item is a pointer at block 38 before issuing the L1 memory request at block 36.

Figure 4:
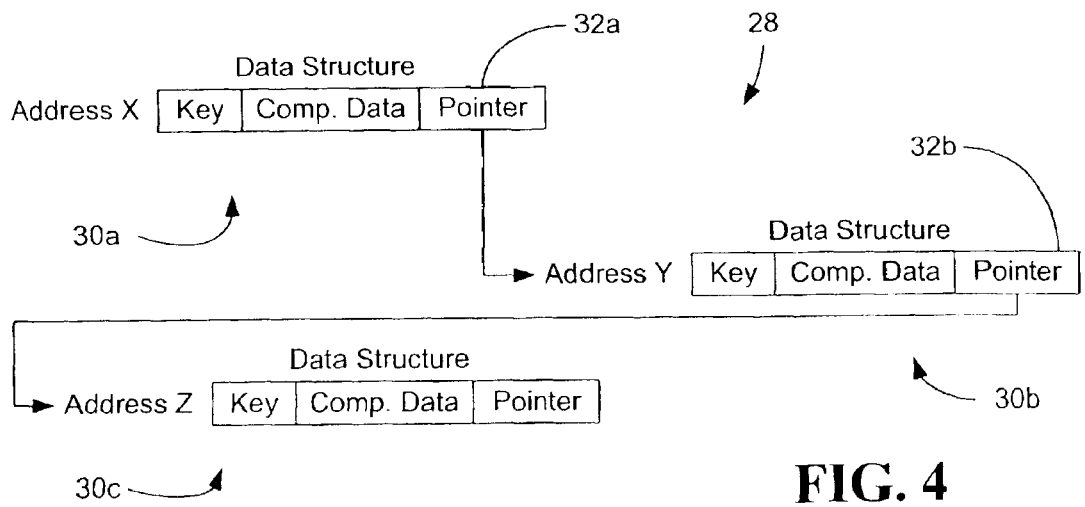
FIG. 4 is a block diagram of an example of a conventional linked list of data structures.
Figure 5A:
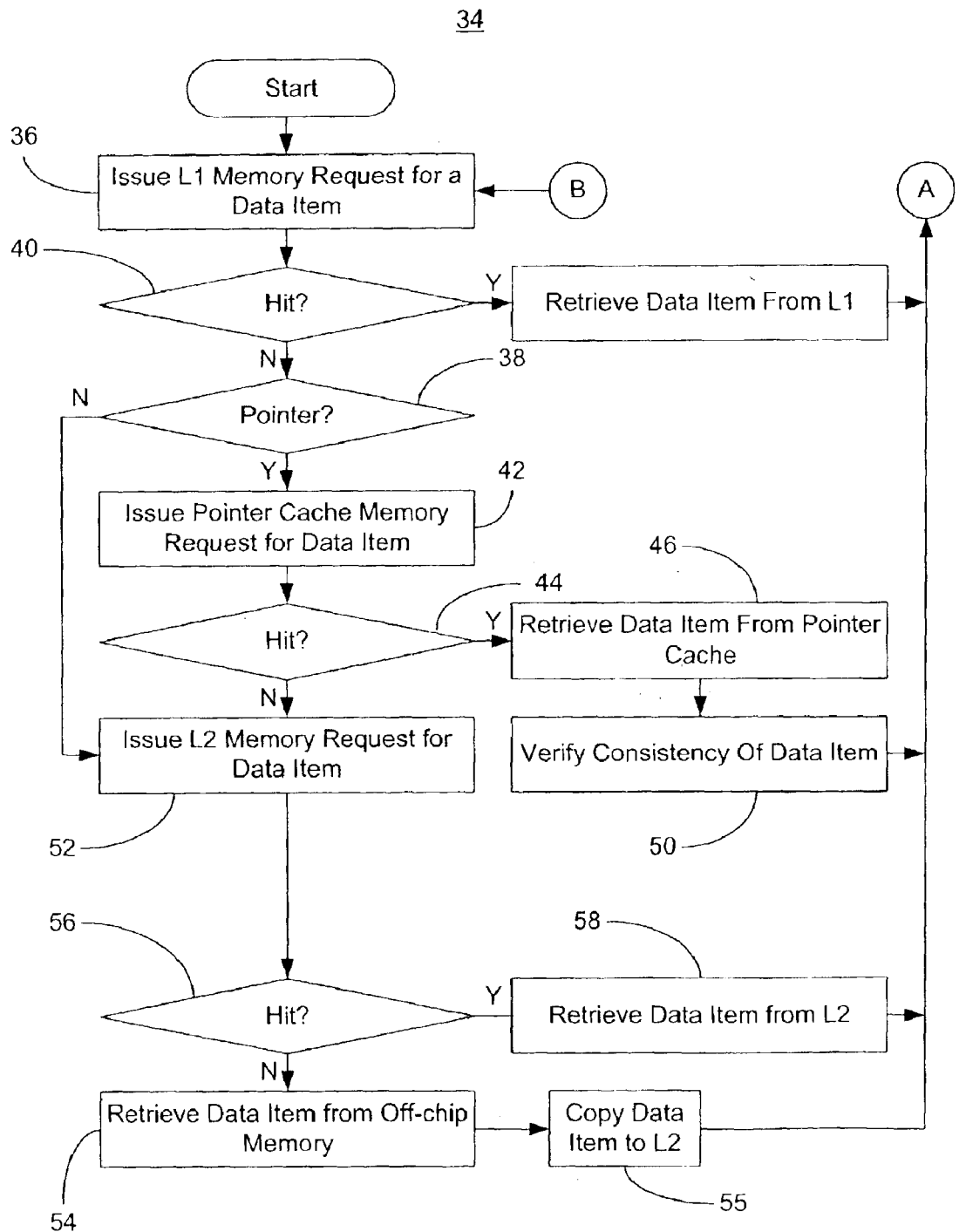
FIG. 5A is a flowchart of an example of a method of managing processor requests to load data items in accordance with one embodiment of the invention.
Figure 5B:
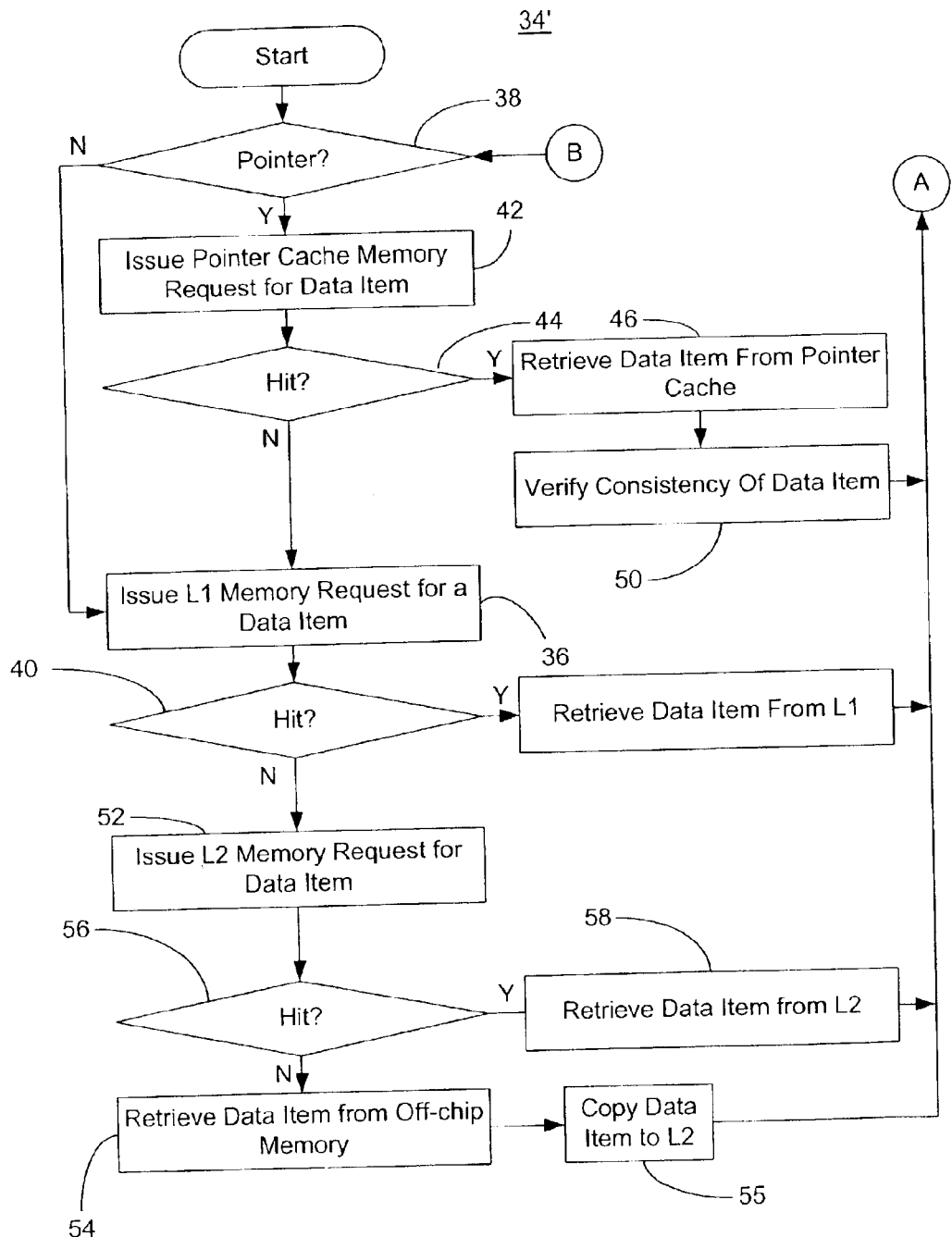
FIG. 5B is a flowchart of an example of a method of managing processor requests to load data items in accordance with another embodiment of the invention.

With continuing reference to FIGS. 4 and 5A, it is important to note that the first data item may be a pointer 32a that is not found in the L1 cache. Pointer 32a, if available, can be resolved into Address Y by the appropriate address generation unit of the processor execution system. Therefore, by maintaining the pointer 32a in a dedicated pointer cache (or by otherwise retaining the pointer longer than non-pointer data items), the data structure 30b located at Address Y can be retrieved sooner than possible under conventional approaches. Simply put, the illustrated approach provides for issuing a memory request for the L1 cache for the second data item, pointer 32b, before the pointer 32b would have been available from off-chip memory. It should also be noted that typically, the memory architecture is part of a multi-processor environment, in which consistency is traditionally maintained via "stores" and "snoops" from other on-chip memories. If the pointer cache is not included in the store/snoop scheme, method 34 provides for verifying the consistency of the first data item with one or more memory architectures of other processors in the multi-processor environment at block 50.

If either the first data item is not a pointer or the pointer is not found in the pointer cache, a memory request is issued at block 52 to the level two (L2) cache of the processor for the first data item, and the first data item is retrieved from the off-chip memory at block 54 in the case of a L2 cache miss. The data item is added to the L2 cache at block 55. If it is determined at block 56 that the L2 cache contains the first data item, block 58 provides for retrieving the first data from the L2 cache.

Figure 6:
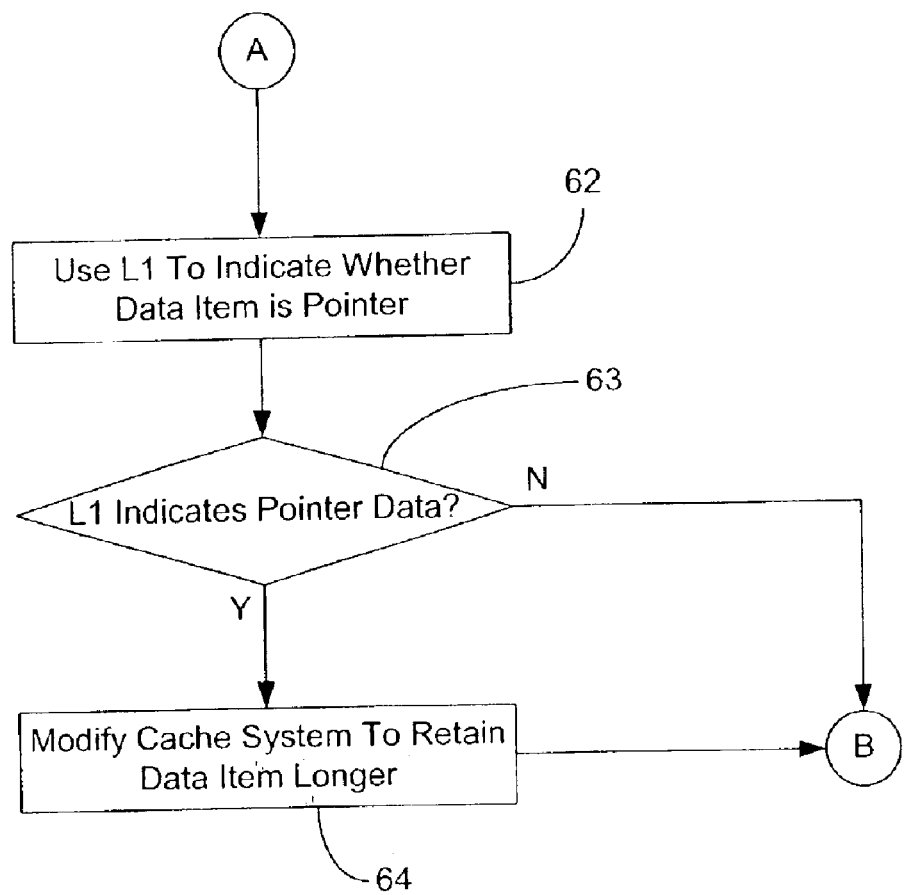
FIG. 6 is a flowchart of an example of a process of classifying a request to load a data item in accordance with another embodiment of the present invention.

FIG. 6 demonstrates that if the first data item is found in the L1 cache, the L2 cache, or must be retrieved from off-chip memory, the data item may be classified as being a pointer load or a non-pointer load at method 60. Generally, once the first data item is retrieved from the processor memory architecture, the cache system of the memory architecture is used at block 62 to indicate whether the data item is a pointer. If it is determined at block 63 that the data item is a pointer, the cache system of the memory architecture is modified at block 64 to retain the first data item longer than one or more non-pointer data items. Otherwise, method 60 proceeds to the next instruction at block 66.

Figure 7:
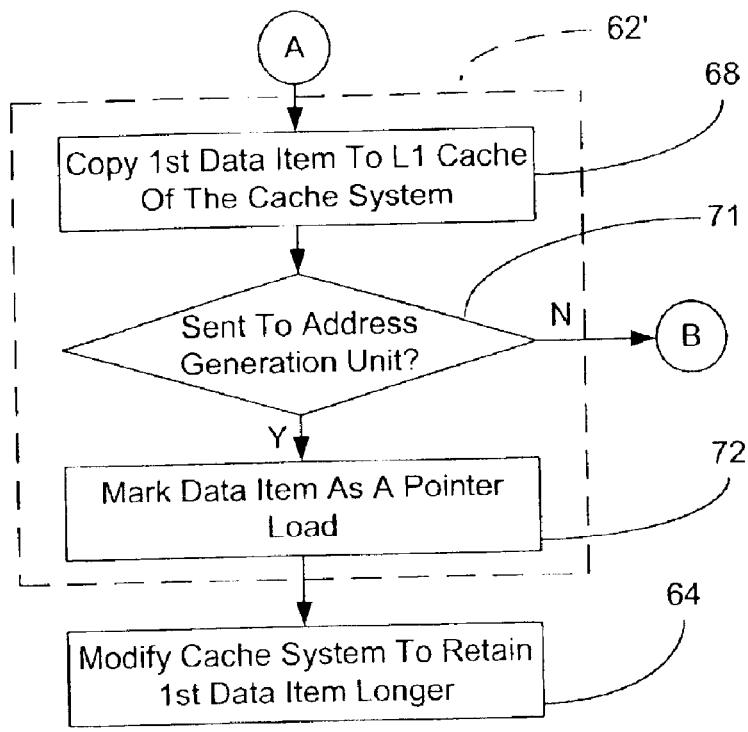
FIG. 7 is a flowchart of an example of a process of classifying a request to load a data item in accordance with an alternative embodiment of the invention.
Figure 8:
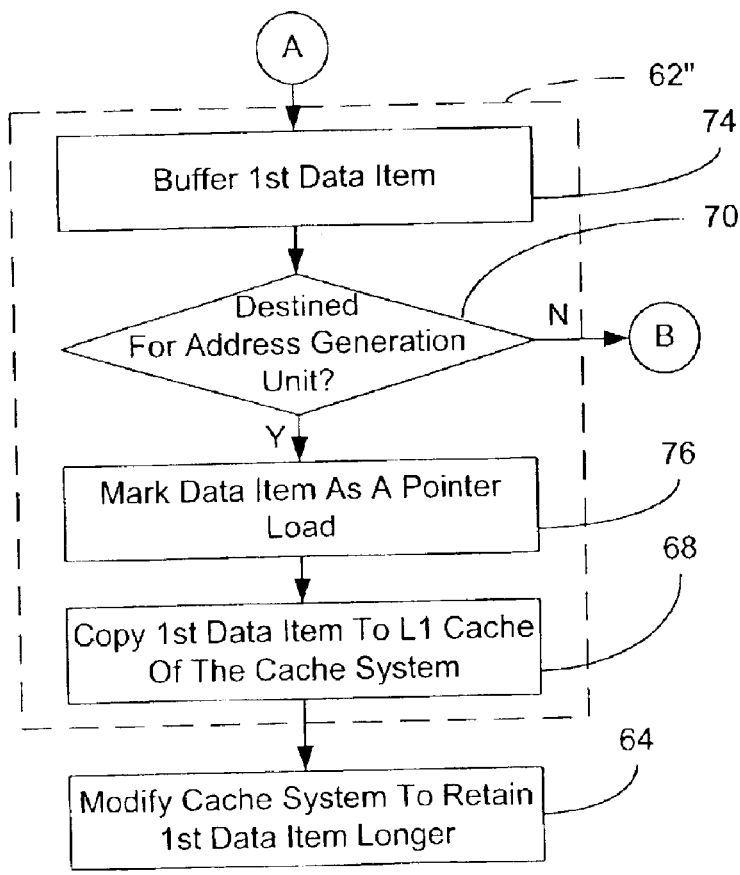
FIG. 8 is a flowchart of an example of a process of classifying a request to load a data item in accordance with a second alternative embodiment of the invention.

FIGS. 7 and 8 illustrate alternative approaches to using the L1 cache to indicate whether the data item is a pointer at blocks 62' and 62", respectively. Specifically, it can be seen that FIG. 7 represents a "history-based" approach, whereas FIG. 8 represents a "buffering-based" approach. For example, in FIG. 7, block 62' provides for copying the first data item to the L1 cache at block 68. It should be noted that it is common for L1 caches to have a "Harvard" architecture, wherein the cache is divided into an instruction cache and a data cache. Under such an approach, the load operational code (opcode) would be written to the instruction cache and the pointer operand would be written to the data cache. Processing block 71 provides for determining whether the data item was sent to an address generation unit. This is done because modern processor execution systems employ various types of execution units such as integer units, floating point units, and address generation units. If the data item is a pointer, the requesting unit will typically be an address generation unit. If the data item was sent to an address generation unit, block 72 provides for marking the data item as a pointer load. It should be noted that block 72 effectively provides a mechanism for "looking back" along the instruction stream so that the next time the data item is encountered, it is known to be bringing in a pointer.

FIG. 8 demonstrates a second alternative approach to using the L1 cache to indicate whether the first data item is a pointer in greater detail at block 62". Specifically, the first item is buffered at block 74 until the usage of the data that is being brought in can be determined. Thus, the data item can be known "up front" as being a pointer load. It should be noted that if the instruction cache contains annotations and the annotated code is known to be frequently executed (i.e., "hot"), the extra delay can be amortized over multiple executions of the particular pointer load. Thus, block 70 provides for determining the destination execution unit, and the data item is marked as being a pointer load at block 76 if the destination execution unit is an address generation unit. The first data item is copied to the L1 cache of the cache system at block 68, after marking the first data item.

Figure 9:
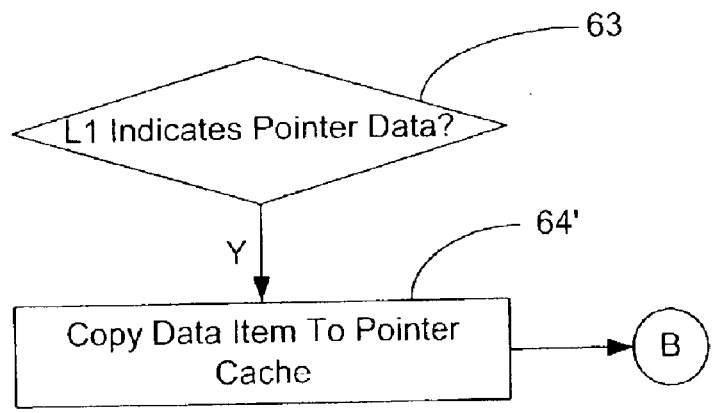
FIG. 9 is a flowchart of an example of a process of using a level one cache to indicate that a data item is a pointer in accordance with one embodiment of the invention.
Figure 10:
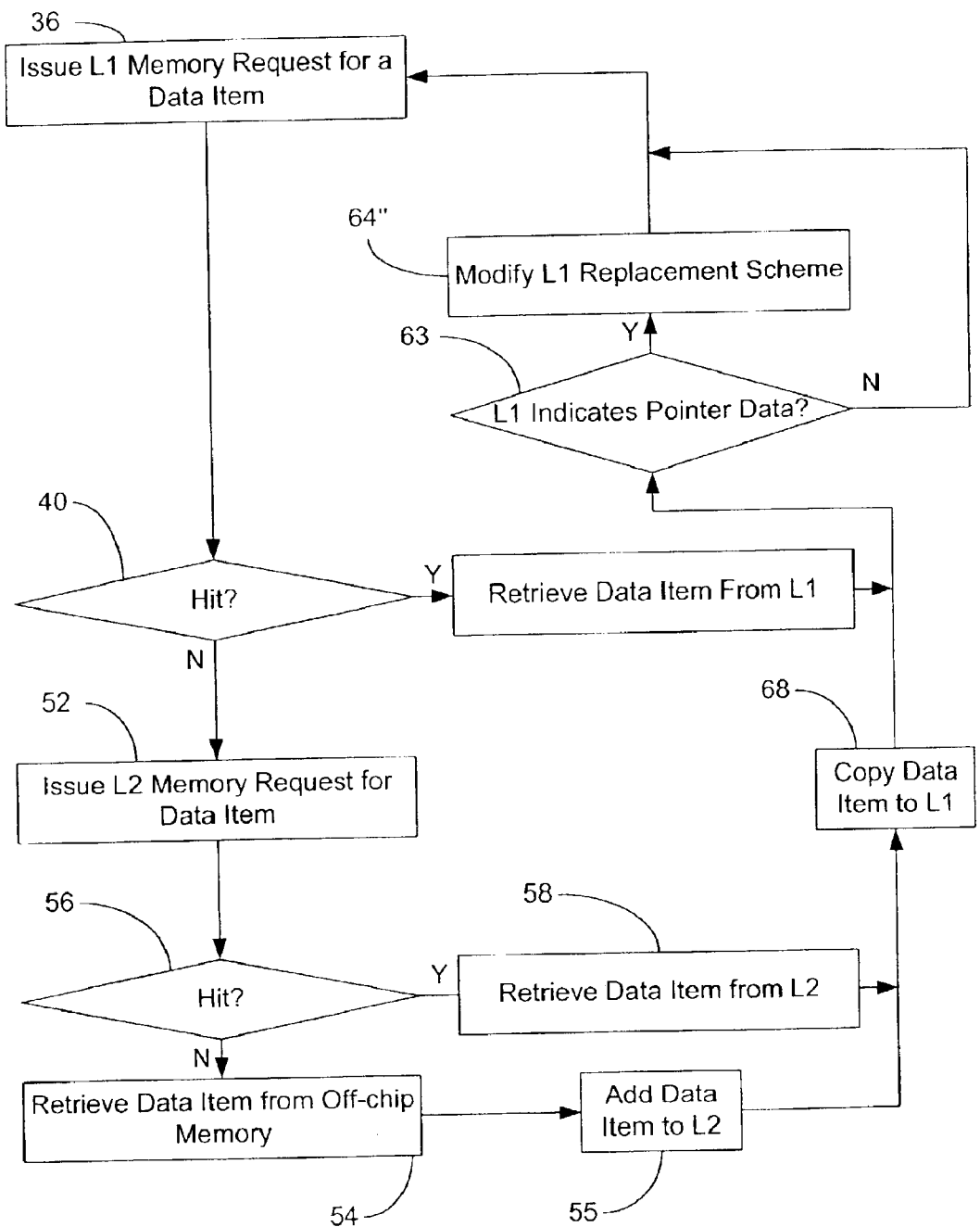
FIG. 10 is a flowchart of an example of a process of using a level one cache to indicate that a data item is a pointer in accordance with an alternative embodiment of the invention.

FIGS. 9 and 10 demonstrate alternative approaches to modifying the cache system to retain the first data item longer than one or more non-pointer data items at blocks 64' and 64", respectively. Specifically, FIG. 9 illustrates that the first data item may be copied to a pointer cache of the cache system, where the pointer cache is dedicated to pointer data. FIG. 1A illustrates a cache system 78 in which such an approach may be used. Specifically, the cache system 78 has an L1 cache 80, an L2 cache 82 coupled to the L1 cache, and a pointer cache 84 coupled to the L1 and the L2 cache where the pointer cache 84 is dedicated to data items that are pointers. The pointer cache 84 is implemented as static random access memory (SRAM), which has proven to be effective for rapid memory accesses.

It will be appreciated that since there is very little spatial locality around pointers, each line of the pointer cache 84 can be much shorter than the cache lines of the L1 cache and the L2 cache. For example, the illustrated pointer cache 84 has lines that are 30 bits long for 32 bit addresses. In order to avoid generating multiple pre-fetches for the same cache line, only the address bits beyond the cache line size need to be used. Furthermore, the shorter cache lines enable the pointer cache 84 to have many more lines than the L1 cache, even if the pointer cache 84 is the same size as the L1 cache. In the cache hierarchy, the pointer cache 84 can be viewed as being the level 1.5 (L1.5), since the pointer cache 84 is only issued memory requests if pointer loads are encountered. The illustrated pointer cache 84 is an N-way set associative cache (i.e., not direct mapped) and has tags containing hashed addresses in order to achieve an acceptable hit rate. If hits from the pointer cache 84 are verified, or are used only for pre-fetch purposes, then the number of bits used to look up the pointer cache 84 can be shorter than 30 bits. As already discussed, every item of data brought in by a pointer load, even if hit in the L1 cache, is inserted into the pointer cache 84. This is because in many cases a hit is a result of a previous miss on a "key field" in the structure also containing the pointer. Thus, the next time around if the pointer is found only in the pointer cache, this will be enough to overlap the cache miss from the current structure with the cache miss from the previous structure.

Figure 1B:
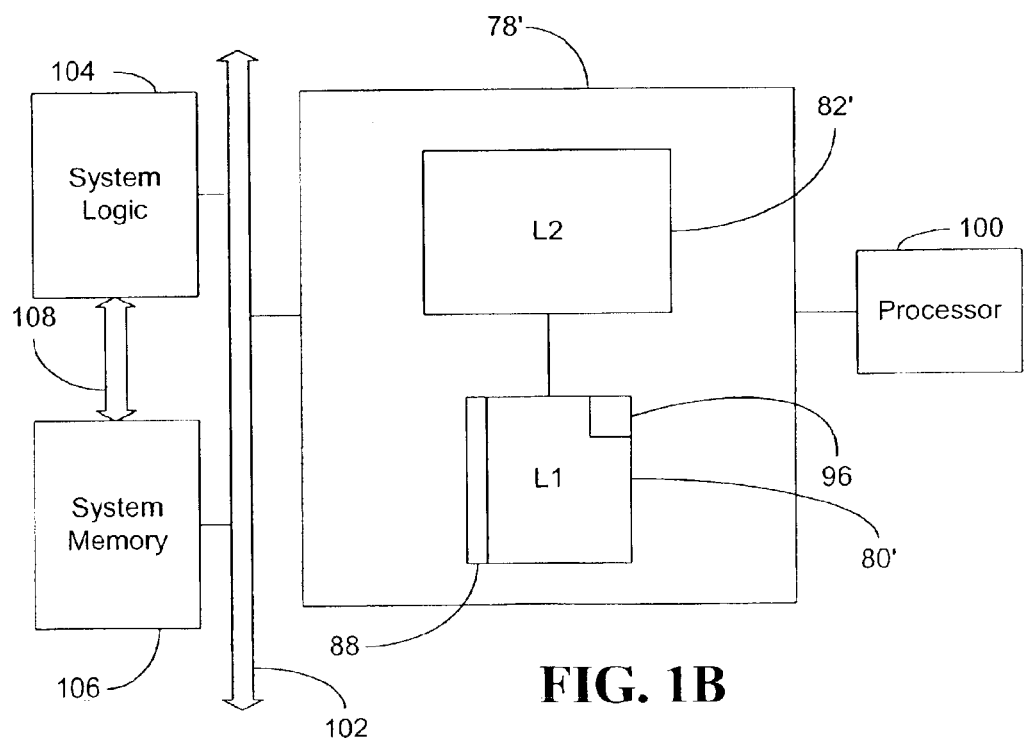
FIG. 1B is a block diagram of an example of a microprocessor cache system in accordance with an alternative embodiment of the invention.
Figure 2:
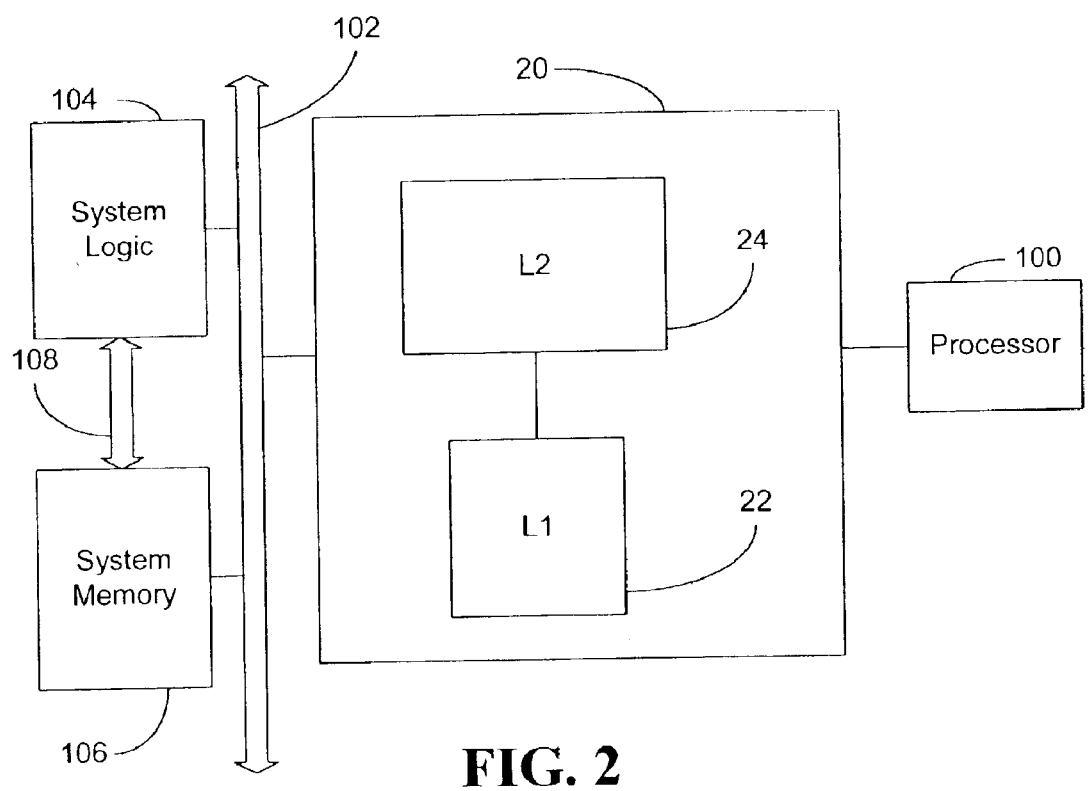
FIG. 2 is a block diagram of an example of a conventional microprocessor cache system.
Figure 3:
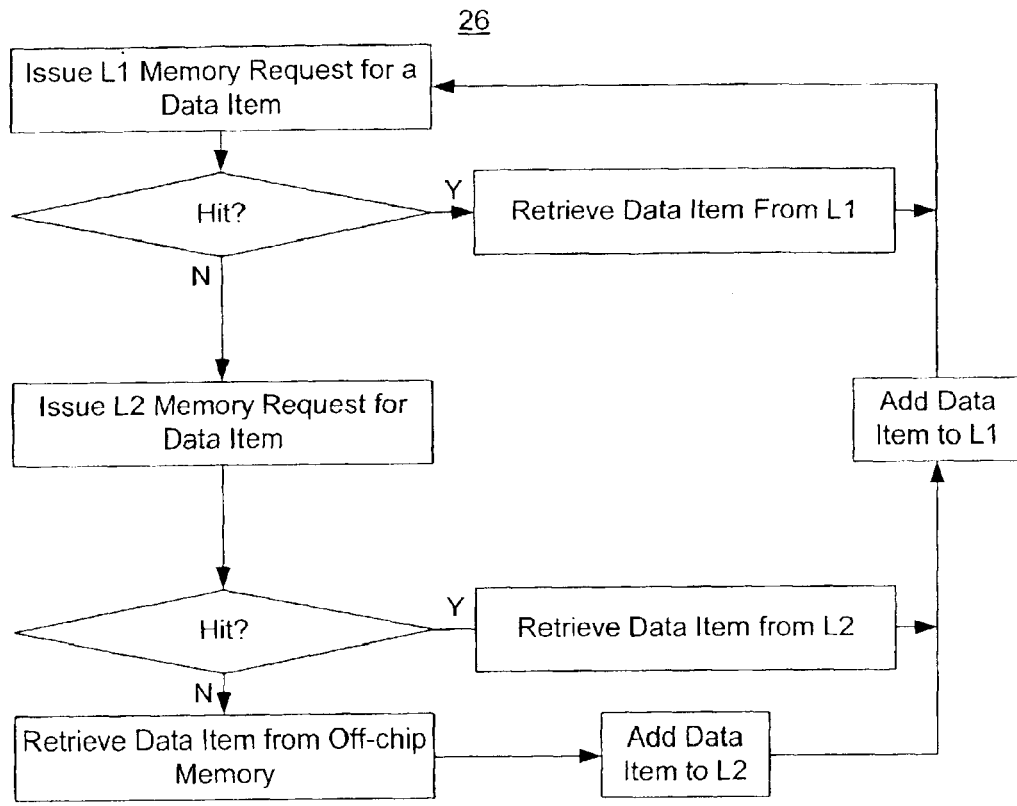
FIG. 3 is a flowchart of an example of a conventional approach to managing processor requests to load data items.

With continuing reference to FIGS. 1B and 10, it can be seen that an alternative approach is to modify the replacement scheme of the cache system 78' at processing block 64". Specifically, the modified replacement scheme ages the pointer data item more slowly than non-pointer data items. Thus, an L1 replacement scheme 88 is modified at processing block 86. One approach to aging the pointer data item would be to increase a set of age bits for the data item by a value of 1 each time the cache is accessed, whereas non-pointer data items are increased by a value of 2. Similarly, the data item can be copied to the L2 cache, and the L2 replacement scheme (not shown) can be modified.

With continuing reference to FIGS. 1A and 1B, it will be appreciated that a marking bit structure 96 can be added to the L1 cache 80 in order to use the L1 cache 80 to indicate whether data items are pointers. Furthermore, the systems and methods described above can be implemented in any number of well documented hardware/software approaches.

The above embodiments and approaches address a key cause of performance degradation in high-speed processors and provide a solution that is not dependent upon regularity in the sequence of addresses defined by a linked list of data structures. By taking into account the relative value of the different items brought in to on high-chip caches, longer retention of pointers can be achieved and performance can be significantly enhanced.

Those skilled in the art can now appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of classifying a request to load a data item, the method comprising:
   retrieving the data item from a processor memory architecture;
   using a cache system of the memory architecture to indicate whether the data item is a pointer;
   determining that the data item is a pointer; and
   modifying the cache system of the memory architecture to retain the data item longer than one or more non-pointer data items.

2. The method of claim 1 further including copying the data item to a pointer cache of the cache system, the pointer cache being dedicated to data items that are pointers.

3. The method of claim 1 further including modifying a replacement scheme of the cache system for the data item, the modified replacement scheme aging the data item more slowly than non-pointer data items.

4. The method of claim 3 further including modifying a replacement scheme of a first cache of the cache system.

5. The method of claim 1 further including:
   copying the data item to a first cache of the cache system;
   determining a destination execution unit for the data item; and
   marking the data item as a pointer load if the destination execution unit is an address generation unit after copying the data item to the first cache.

6. The method of claim 5 further including marking multiple occurrences of the data item in the first cache.

7. The method of claim 1 further including:
   buffering the data item;
   determining a destination execution unit for the data item;
   marking the data item as a pointer load if the destination execution unit is an address generation unit; and
   copying the data item to a first cache of the cache system after marking the data item.

8. The method of claim 1 further including retrieving the data item from an off-chip memory.

9. The method of claim 1 further including retrieving the data item from a second cache of the memory architecture.

10. The method of claim 1 including retrieving the data item from a first cache of the memory architecture.

11. The method of claim 1 wherein the data item is part of a linked list of darn structures, each data structure containing a pointer to another data structure in the list.

12. An apparatus comprising:
   a processor, and
   a memory architecture including a cache system, the processor to retrieve a data item from the memory architecture, determine that the data item is a pointer and modify the cache system to retain the data item longer than one or more non-pointer data items.

13. The apparatus of claim 12, wherein the cache system includes a pointer cache that is dedicated to data items that are pointers, the processor to copy the data item to the pointer cache.

14. The apparatus of claim 12, wherein the cache system includes a replacement scheme, the processor to modify the replacement scheme for the data item, the modified replacement scheme to age the data item more slowly than non-pointer data items.

15. The apparatus of claim 14, wherein the cache system further includes a first cache, the first cache including the replacement scheme.

16. A computing system comprising:
   a processor.
   a memory architecture including a system memory and a cache system, the processor to retrieve a data item from the memory architecture, determine that the data item is a pointer and modify the cache system to retain the data item longer than one or more non-pointer data items;
   a first bus;
   a second bus; and
   system logic to communicate with the system memory via the first bus and communicate with the cache system via the second bus.

17. The computing system of claim 16, wherein the cache system includes a pointer cache that is dedicated to data items that are pointers, the processor to copy the data item to the pointer cache.

18. The computing system of claim 16, wherein the cache system includes a replacement scheme, the processor to modify the replacement scheme for the data item, the modified replacement scheme to age the data item more slowly than non-pointer data items.

19. The computing system of claim 18, wherein the cache system further includes a first cache, the first cache including the replacement scheme.

* * * * *

UNITED STATES PATENT AND TRADEMARK OFFICE
CERTIFICATE OF CORRECTION

PATENT NO.     : 6,965,962 B2
DATED          : November 15, 2005
INVENTOR(S)    : Sheaffer It is certified that error appears in the above-identified patent and that said Letters Patent is hereby corrected as shown below:

Column 6,
Line 15, delete "darn" and insert -- data --.

Signed and Sealed this

Thirty-first Day of January, 2006

JON W. DUDAS
*Director of the United States Patent and Trademark Office*